United States Patent
Whitens et al.

(10) Patent No.: US 9,994,138 B2
(45) Date of Patent: Jun. 12, 2018

(54) SEAT WITH DEPLOYABLE PLASTIC BEAM

(71) Applicant: Ford Global Technologies, LLC, Dearborn, MI (US)

(72) Inventors: Mike James Whitens, Milford, MI (US); Iskander Farooq, Novi, MI (US); Dean M. Jaradi, Macomb, MI (US); Mohammed Omar Faruque, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 119 days.

(21) Appl. No.: 14/956,435

(22) Filed: Dec. 2, 2015

(65) Prior Publication Data

US 2017/0158096 A1   Jun. 8, 2017

(51) Int. Cl.
*B60N 2/62*    (2006.01)
*B60N 2/427*   (2006.01)
*B60N 2/68*    (2006.01)

(52) U.S. Cl.
CPC ......... *B60N 2/914* (2018.02); *B60N 2/42763* (2013.01); *B60N 2/62* (2013.01); *B60N 2/68* (2013.01)

(58) Field of Classification Search
CPC ..... B60N 2/4415; B60N 2/62; B60N 2/42763
See application file for complete search history.

(56) References Cited

U.S. PATENT DOCUMENTS

| | | | |
|---|---|---|---|
| 5,082,326 A * | 1/1992 | Sekido | B60N 2/4415 297/284.6 |
| 5,374,105 A | 12/1994 | Kracht et al. | |
| 5,695,242 A | 12/1997 | Brantman et al. | |
| 5,772,281 A * | 6/1998 | Massara | B60N 2/4415 297/284.4 |
| 6,296,292 B1 | 10/2001 | Feldman | |
| 6,450,573 B1 | 9/2002 | Yamaguchi | |
| 6,648,409 B1 | 11/2003 | Laporte | |
| 6,672,667 B1 | 1/2004 | Park | |

(Continued)

FOREIGN PATENT DOCUMENTS

DE   DT2330745 A1   1/1975
DE   DT2455258 A1   5/1976

(Continued)

OTHER PUBLICATIONS

UKIPO Search Report Under Section 17(5) for Application No. GB1620431.5 dated May 31, 2017 (4 pages).

(Continued)

*Primary Examiner* — Timothy J Brindley
(74) *Attorney, Agent, or Firm* — Frank A. MacKenzie; Bejin Bieneman PLC

(57) ABSTRACT

A beam module for a vehicle seat is mounted at a front of a seat, on top of a seat pan and underneath a seat cushion. The module includes a molded plastic beam. The module has a first shape substantially flush with the seat pan and a second shape projecting above the seat pan. The molded plastic beam has a mounting flange with a forward portion and a second portion. The molded plastic beam is inflatable. When inflated, the molded plastic beam assumes its second shape with the seat cushion being correspondingly displaced and deformed to raise the seat cushion when a frontal impact is detected.

12 Claims, 3 Drawing Sheets

(56) References Cited

U.S. PATENT DOCUMENTS

| | | | |
|---|---|---|---|
| 6,682,141 B2* | 1/2004 | Reynolds | B60N 2/42763 296/68.1 |
| 6,817,627 B2* | 11/2004 | Galmiche | B60R 21/205 280/730.1 |
| 6,874,811 B2* | 4/2005 | Enders | B60R 21/206 280/730.1 |
| 6,896,325 B2* | 5/2005 | Takedomi | B60R 21/207 280/730.1 |
| 6,935,684 B2* | 8/2005 | Sakai | B60N 2/4221 297/216.1 |
| 7,264,271 B2 | 9/2007 | Barvosa-Carter et al. | |
| 7,328,945 B2* | 2/2008 | Yoshikawa | B60N 2/42718 280/730.1 |
| 7,367,587 B2* | 5/2008 | Taoka | B60R 21/045 280/728.2 |
| 7,758,121 B2* | 7/2010 | Browne | B60R 7/043 297/216.1 |
| 8,702,120 B2 | 4/2014 | Kalisz et al. | |
| 2003/0151234 A1 | 8/2003 | Ruel | |
| 2004/0178616 A1* | 9/2004 | Yoshikawa | B60N 2/4221 280/748 |
| 2004/0222680 A1 | 11/2004 | Freisler et al. | |
| 2006/0119149 A1* | 6/2006 | Yoshikawa | B60N 2/42718 297/216.1 |
| 2006/0267325 A1* | 11/2006 | Kumagai | B60R 21/207 280/753 |
| 2007/0080527 A1* | 4/2007 | Itoga | B60N 2/42718 280/733 |
| 2010/0066142 A1* | 3/2010 | Gross | B60N 2/42763 297/284.1 |
| 2014/0167465 A1* | 6/2014 | Sakata | B60N 2/0284 297/284.11 |
| 2014/0284987 A1* | 9/2014 | Yasuda | B60N 2/686 297/452.18 |
| 2016/0031400 A1 | 2/2016 | Ruthinowski et al. | |
| 2016/0236597 A1* | 8/2016 | Dry | B60N 2/525 |
| 2016/0347206 A1* | 12/2016 | Line | B60N 2/7064 |
| 2017/0043689 A1* | 2/2017 | Dry | B60N 2/4415 |
| 2017/0080838 A1* | 3/2017 | Dry | B60N 2/4415 |

FOREIGN PATENT DOCUMENTS

| | | |
|---|---|---|
| DE | 3934588 A1 | 4/1991 |
| DE | 102007000343 A1 | 3/2008 |
| EP | 1571039 A1 | 9/2005 |
| WO | 2006004485 A1 | 1/2006 |
| WO | 2013182307 A1 | 12/2013 |

OTHER PUBLICATIONS

Seat Cushion Airbag, posted Apr. 2015 by Ron Moore. Available at: http://www.universityofextrication.com/2015/04/seat-cushion-airbag/. Particularly the second paragraph.

* cited by examiner

SEAT WITH DEPLOYABLE PLASTIC BEAM

BACKGROUND

A frontal vehicle impact can rapidly decelerate a vehicle. Vehicle occupants, to the extent they are not rigidly restrained and are able to move within the vehicle, do not decelerate in synchronicity with the vehicle. The momentum of the occupants causes them to continue to move forward relative to the vehicle during a rapid deceleration of the vehicle. When an occupant is partially restrained by a conventional three-point seat belt system including a lap belt and a shoulder belt, it may still be possible for the occupant's thighs and pelvis to slide forward. Such forward motion has been characterized as submarining, as the occupant's thighs and sometimes their pelvis slide under the vehicle's dashboard.

DETAILED DESCRIPTION

Relative orientations and directions (by way of example, upper, lower, bottom, forward, rearward, front, rear, back, outboard, inboard, inward, outward, superior, inferior) are set forth in this description not as limitations, but for the convenience of the reader in picturing at least one embodiment of the structures described.

Figure 1:
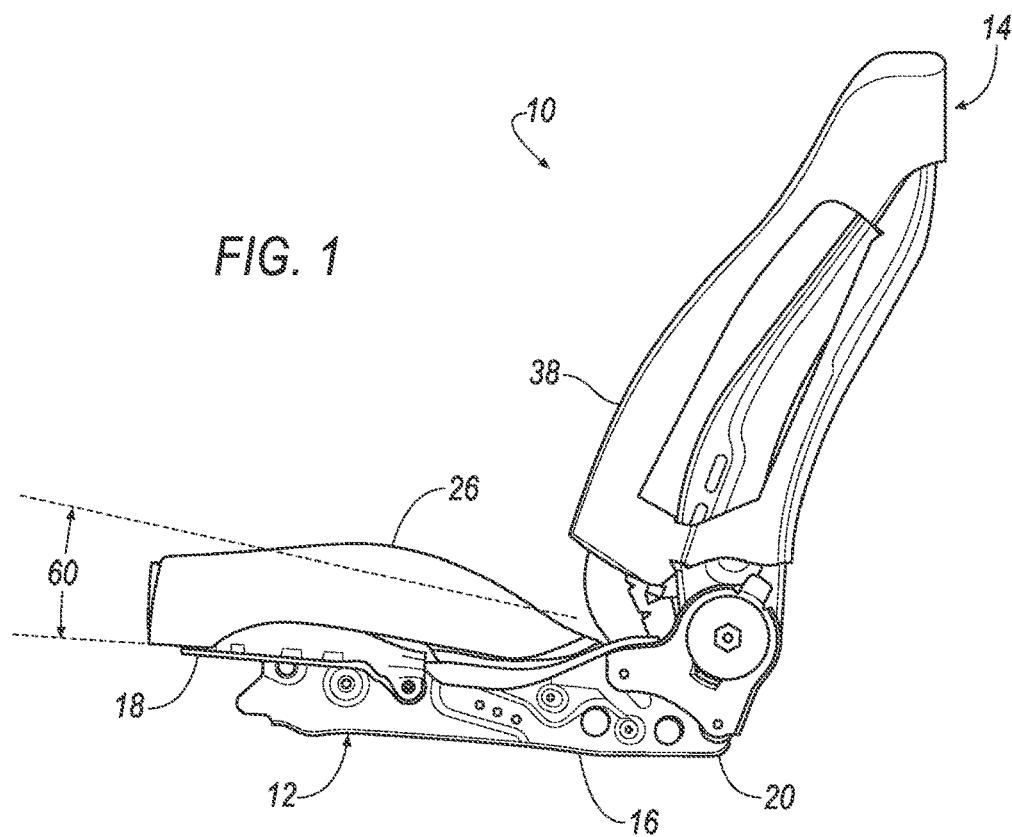
FIG. 1 is a partially sectioned side view of an example of a seat assembly for a vehicle with an undeployed deployable beam proximate to a forward edge of the seat.

An exemplary seat assembly 10 is illustrated in FIG. 1. When mounted in a vehicle, seat assembly 10 has a substantially horizontal seat 12 and a substantially vertical seat back 14. The seat back 14 is fixed at its lower end to a back end of seat 12. In an installed condition, seat 10 is mounted to a vehicle floor by a seat mount (not shown).

Seat 12 includes an exemplary seat frame assembly 16 with a seat cushion 26 disposed thereover. A seat cover (not shown), commonly of fabric or leather material, is disposed over cushion 26 and frame assembly 16. Seat frame assembly 16, best seen in FIG. 3 and FIG. 5, includes a seat pan 18 fixed to a first seat frame side member 20 and a second seat frame side member 21. Seat pan 18 can be formed of any suitably stiff material, including but not limited to sheet steel and composite carbon fiber material. A plurality of seat support springs 22 extend in a fore-aft direction between and connecting seat pan 18 and a rear cross member 24 of the of seat frame assembly 16. Seat 12 further includes a seat cushion 26 disposed over seat frame assembly 16.

An exemplary structure of seat back 14 is described as follows. Exemplary seat back 14 includes a seat back frame assembly 28. Seat back frame assembly 28, best seen in FIG. 3 and FIG. 5, includes left and right side members 30 and 32 respectively connected by upper cross member 34 and lower cross member 36. A seat back cushion 38 is disposed over a forward side of frame assembly 28. An opening defined by members 30, 32, 34 and 36 is closed on a rear side by a rear panel 40. A seat back cover 42, shown in part in FIGS. 1 and 2, and coordinating with the seat cover, is disposed over seat back frame assembly 28 and cushion 38. Cover 42 can be disposed over panel 40, or can be integrated with panel 40 so that panel 40 is exposed in the finished seat assembly 10.

Seat assembly 10 includes an illustrated exemplary deployable beam module 44 mounted at the front of seat 12, on an upward-facing surface of seat pan 18. Module 44 includes an inflatable plastic beam 46 on the top of seat pan 18, and an inflation mechanism 48 below seat pan 18. Alternatively, mechanism 48 can be disposed inside of integrated within a beam void 66 and reside on the top of seat pan 18. Seat cushion 26 is disposed over seat frame assembly 16. Inflation mechanism 48 is electrically connected to an electronic control unit (not shown). Such electronic connections may be made with wire or without wire. Inflation mechanism 48 deploys plastic panel 46 responsive to a command from the electronic control unit.

The electronic control unit issues commands based in part on system logic stored in the electronic control unit and on data received from sensors electrically connected to the electronic control unit. More specifically the electronic control unit includes at least one electronic processor and associated memory. The processor's operating system software is stored in memory for access by the processor. The system logic for executing certain predetermined tasks, as expressed in software, is maintained in memory. The memory also accommodates a buffer region enabling the storage and manipulation of data. The different memory sections can be accommodated either with a single device, or with multiple devices dedicated to particular memory functions. The precise structure of the electronic control unit is not critical to the present description.

Figure 3:
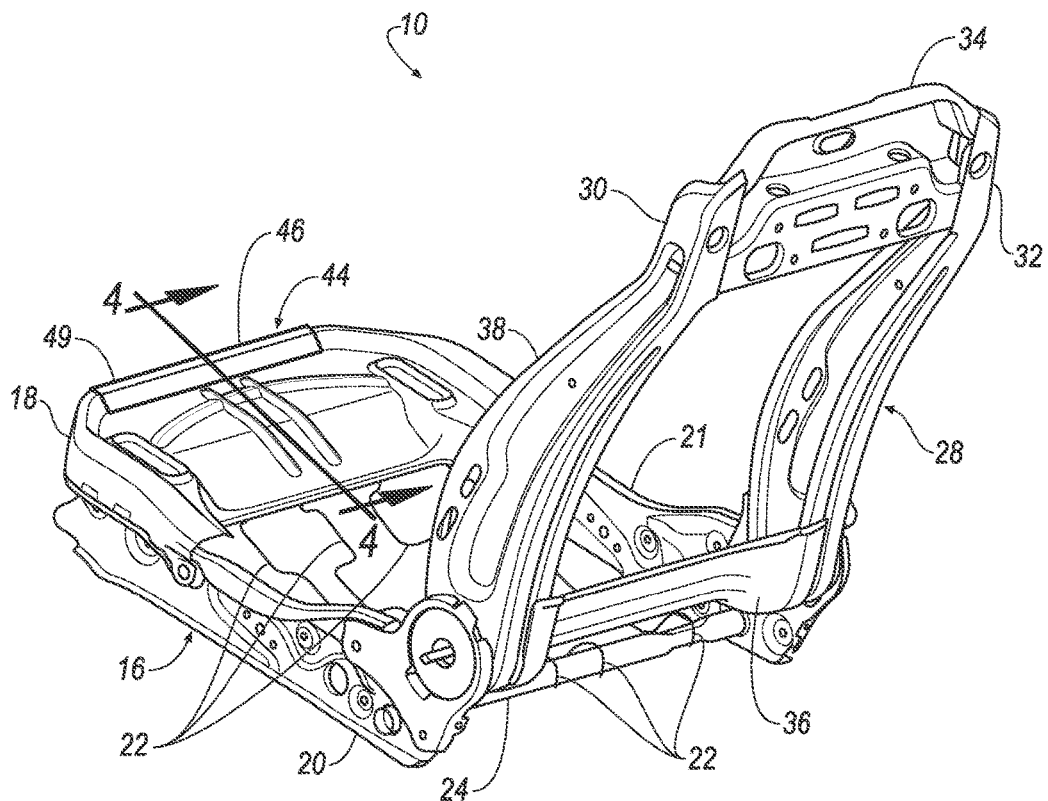
FIG. 3 is a perspective view of a frame of the seat of FIG. 1 without any cushions and with the deployable beam in an undeployed condition.
Figure 4:
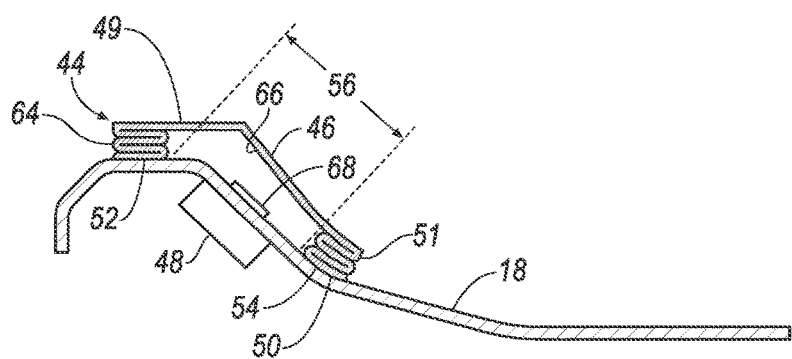
FIG. 4 is a sectioned view of the seat of FIG. 3 in the direction of arrows 4.

FIGS. 1, 3 and 4 show module 44 with beam 46 in an undeployed condition. FIG. 1 illustrates that the position of cushion 26 is unaffected by the presence of module 44 and specifically by undeployed beam 46. FIG. 3 illustrates a placement of beam 46 on an upward facing surface and a forward edge of seat pan 18. Only a cap portion 49 providing a superior surface of beam 46 is visible in FIG. 3. FIG. 4 is a schematic section of seat pan 18 and module 44 in a direction of arrows 4 of FIG. 3. Beam 46, as illustrated, is open on a side facing seat pan 26. Exemplary beam 46 has a circumferential mounting flange 50 providing an uninterrupted periphery of contact between beam 46 and seat pan 18. Flange 50 is connected to cap portion 49 by a wall section 51. Flange 50 has a forward flange portion 52 separated from a rearward flange portion 54 by a flange gap 56. Gap 56 defines an open area in beam 46. In one embodiment, flange 50 and seat pan 26 are sealingly engaged to provide an air-tight sealing bond at their interface. The means of forming the bond is a function of the materials of which seat pan 26 and beam are formed of. Alternatives for fixing and sealing beam 46 to seat pan 18 include heat staking and sonic welding. In another alternative embodiment (not shown), beam 46 is formed as a sealed or vented bladder. The bladder has a flange extending out from the beam, and circumscribing a lower part of the bladder and fixing the beam to seat pan 18. Yet alternatively, the flange could be limited to a forward flange portion and a rearward flange portion, separated by a flange gap which would be substantially equal to the width of the bladder. A lower panel of the bladder closes the gap between the flange portions. Both flange portions would be fixed to the seat pan 18. With a sealed or vented bladder, there is no need to seal the flange against seat pan 18.

Figure 2:
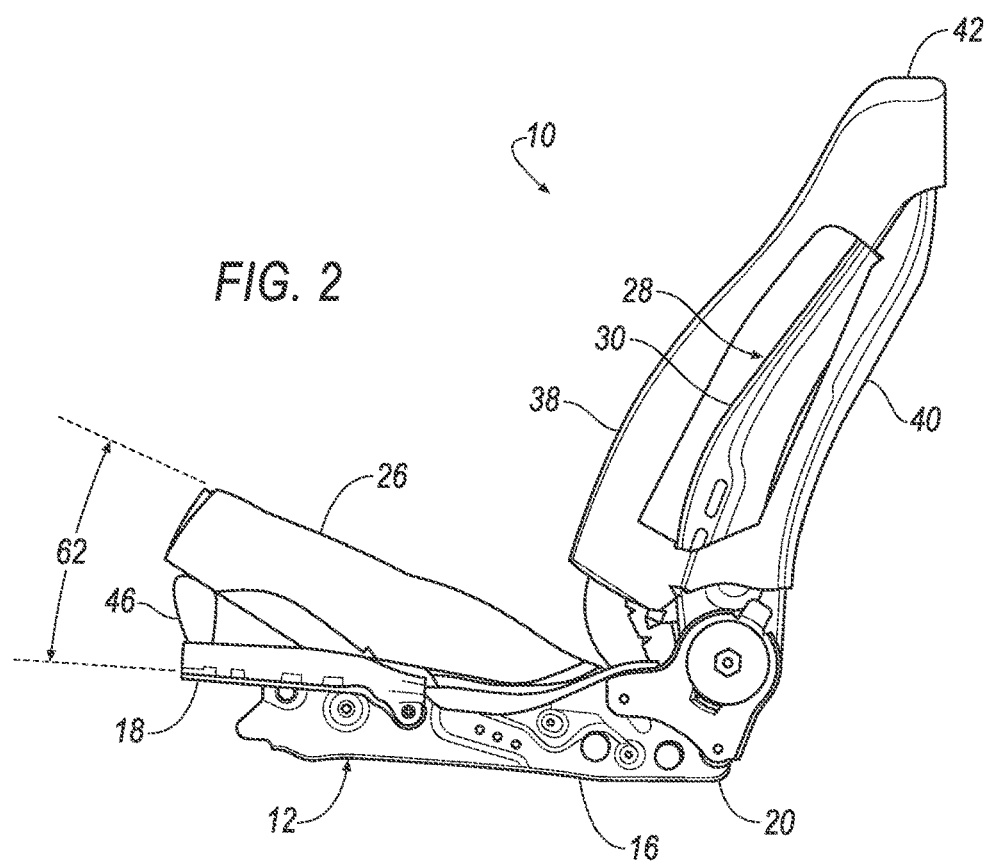
FIG. 2 is a partially sectioned side view of the seat assembly of FIG. 1 with the deployable beam in a deployed condition.
Figure 5:
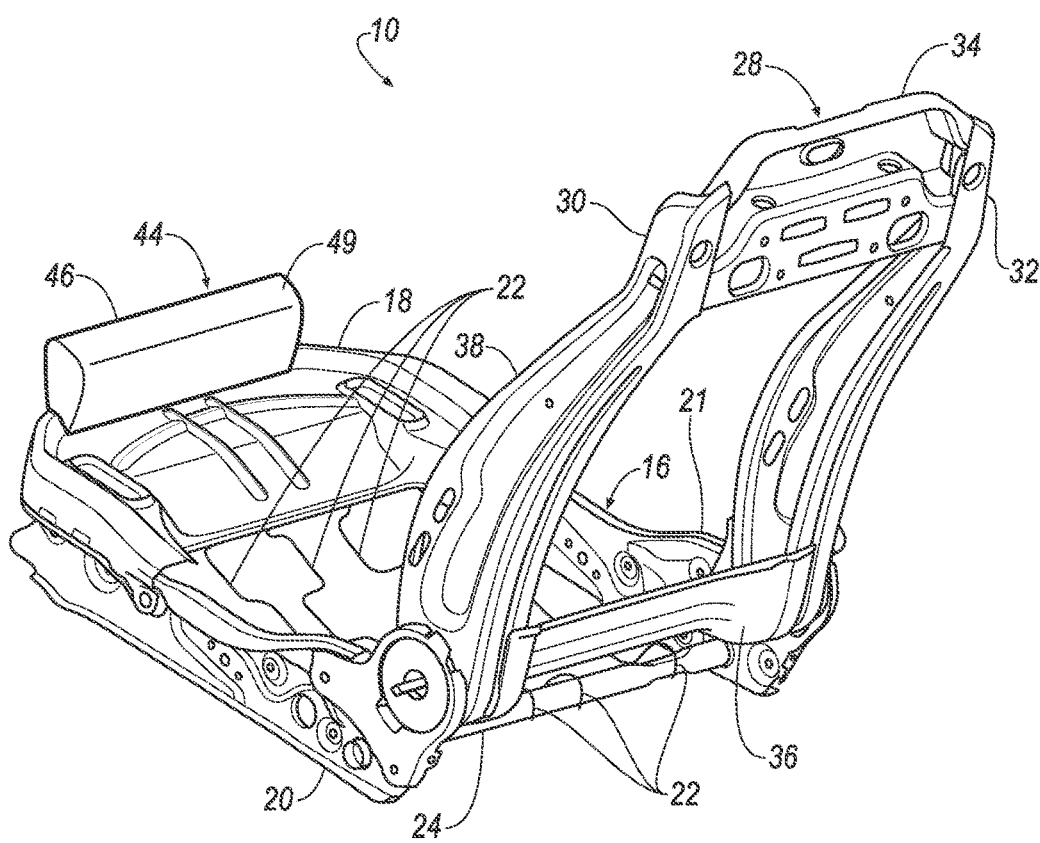
FIG. 5 is a perspective view of the seat frame of FIG. 3 with the deployable beam in a deployed condition.

Beam module 44 is deployable to enable raising a forward end of seat cushion 26 when a frontal impact is detected. An illustrated exemplary seat position angle increases from an undeployed seat ramp angle 60 as shown in FIG. 1 to a significantly larger deployed seat ramp angle 62 as shown in FIG. 2. Exemplary values for angles 60 and 62 are 30° and 45° respectively. FIG. 5 also shows beam 46 in a deployed or inflated condition. FIG. 2 illustrates the upward displacement of seat cushion 26 by inflated beam 46. Illustrated exemplary accordion folds 64 in the wall section 51 enable beam 46 to expand from its undeployed shape substantially flush with seat pan 18 to a deployed shape in which the folds 64 of wall section 51 are at least partially straightened. The exemplary seat cover is formed of materials selected to enable such displacement by including expansion pleats or stretchable material (not shown) in a substantially vertical region of the seat cover between a panel on a substantially horizontal seating surface of seat 12 and a lower edge of seat 12.

When module 44 is activated and deployed, inflation mechanism 48 releases gas into beam void 66 via an inflation mechanism outlet 68 of inflation mechanism 48 in fluid communication with void 66. In the illustrated exemplary embodiment, void 66 is cooperatively defined by beam 46 and seat pan 18. With inflation, cap portion is displaced away from seat pan 18. The beam, molded of a plastic, an exemplary plastic being polypropylene, has sufficient wall thickness, an exemplary wall thickness ranging between 2 and 4 mm, and internal pressure when deployed, an exemplary range being 15 to 20 psi at a temperature of approximately 70° F., to resist folding forward and localized deformation when subjected to the type of loading associated with a passenger tending to submarine. As illustrated in FIGS. 2-5, the mounting flange 50, the wall section 51 and the cap portion 49 cooperatively present a continuous surface. The fore-aft spacing of the portions 52, 54 of flange 50 also contributes significantly to the resistance of beam 46 to forward rolling when subjected to a load in the forward direction.

The disclosed deployable beam module is beneficially easily and cost effectively incorporated into current vehicles with minimal effect on the seat frame assembly design. A seat having a deployable beam module 44 restrains occupants more effectively during frontal impacts than a conventional seat by decreasing the likelihood of submarining. Molding the beam of plastic provides a beam that is more solid and resistant to localized deflection and forward bending than a beam formed of alternative materials such as fabric. As noted above, the fore-aft separation of the beam's forward and rearward flanges further resists forward forces against the beam that otherwise tend to cause the beam to pivot forward, around its mounting location at the seat pan.

As used herein, the adverb "substantially" modifying an adjective means that a shape, structure, measurement, value, calculation, etc. may deviate from an exact described geometry, distance, measurement, value, calculation, etc., because of imperfections in materials, machining, manufacturing, sensor measurements, computations, processing time, communications time, etc.

It is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto, along with the full scope of equivalents to which such claims are entitled. Unless otherwise stated or qualified herein, all claim terms are intended to be given their plain and ordinary meanings. It is anticipated and intended that future developments will occur in the arts discussed herein, and that the disclosed systems and methods will be incorporated into such future embodiments. In sum, it should be understood that the disclosed subject matter is capable of modification and variation.

What is claimed is:

1. A beam module for a forward edge of a vehicle seat, the module comprising an inflatable molded plastic beam, including:
   a cap portion defining a closed side of the beam distal to a mounting flange;
   a wall section having accordion folds and disposed between and connecting the mounting flange and the cap portion and defining a void between the cap portion and the mounting flange;
   the mounting flange circumscribing an uninterrupted periphery of the beam on a side of the beam opposite the cap portion, and defining an open area open to the void, and the flange and the wall section and the cap portion presenting a continuous surface;
   the flange having a forward flange portion and a rearward flange portion with the portions being separated by the open area;
   the beam having an undeployed shape in which the accordion folds are collapsed and the beam is substantially flat; and
   the beam having a deployed shape in which the accordion folds are at least partially straightened and the cap portion is spaced from the flange,
   wherein in an installed condition the mounting flange is sealingly bonded to a seat pan, and the seat pan is a carbon fiber reinforced composite molding.

2. The beam module of claim 1, wherein the beam having a wall thickness exceeding 2 mm in a mounted and inflated condition is resistant to deformation and pivoting displacement.

3. The beam module of claim 1, wherein the module is attached to the seat pan by ultrasonic welds.

4. The beam module of claim 1, wherein an inflation mechanism is mounted to the seat pan and having an outlet in fluid communication with the void, the void being cooperatively defined by the plastic beam and the seat pan.

5. A vehicle seat assembly comprising:
   a seat including:
      a seat frame assembly including a seat pan,
      a seat cushion disposed over the seat frame assembly and a beam module, and
      a seat cover disposed over the seat cushion and seat frame assembly;
   a seat back including:
      a seat back frame assembly,
      a seat back cushion, and
      a seat back cover; and
   the beam module fixed to the seat pan under the seat cushion, the beam module being deployable and including an inflatable plastic beam including:
      a cap portion defining a closed side of the beam distal to a mounting flange,
      a wall section having accordion folds and disposed between and connecting the mounting flange and the cap portion and defining a void between the cap portion and the mounting flange, the mounting flange circumscribing an uninterrupted periphery of the beam on a side of the beam opposite the cap portion, and defining an open area open to the void, and the flange and the wall section and the cap portion presenting a continuous surface, the mounting flange sealingly bonded to the seat pan and having a forward flange portion and a rearward flange portion with the portions being separated by the open area, the beam having an undeployed shape in which the accordion folds are collapsed and the beam is substantially flat, and the beam having a deployed shape in which the accordion folds are at least partially straightened and the cap portion is spaced from the flange.

6. The seat of claim 5, wherein the beam having a wall thickness exceeding 2 mm in a mounted and inflated condition is resistant to deformation and pivoting displacement.

7. The seat of claim 5, wherein the seat pan is a carbon fiber reinforced composite molding.

8. The seat of claim 7, wherein the module is attached to the seat pan by ultrasonic welds.

9. The seat of claim 5, wherein an inflation mechanism is mounted to the seat pan and having an outlet in fluid communication with the void, the void being cooperatively defined by the plastic beam and the seat pan.

10. An inflatable molded plastic beam for a vehicle seat, including:

a cap portion;

a mounting flange;

a collapsible wall section connecting the mounting flange and the cap portion and defining a void between the cap portion and the mounting flange;

the mounting flange circumscribing an uninterrupted periphery of the beam on a side of the beam opposite the cap portion, and defining an open area open to the void, and the flange and the wall section and the cap portion presenting a continuous surface;

the flange having a forward flange portion and a rearward flange portion separated by the open area;

the beam having an undeployed shape in which the wall section is collapsed and the beam is substantially flat;

the beam having a deployed shape in which the wall section is at least a partially straightened flange, wherein in an installed condition the mounting flange is sealingly bonded to a seat pan, and the seat pan is a carbon fiber reinforced composite molding.

11. The beam of claim 10, wherein the wall section has accordion folds that are collapsed in the undeployed shape and are at least partially straightened in the deployed shape.

12. The beam of claim 10, wherein the module is attached to the seat pan by ultrasonic welds.

* * * * *